July 10, 1951  H. RINIA ET AL  2,559,799
OPTICAL SYSTEM AND ALIGNMENT MEANS THEREFOR
Filed Jan. 14, 1946

INVENTORS
HERRE RINIA
LEOPOLD M. L. J. LEBLANS
BY
ATTORNEY

Patented July 10, 1951

2,559,799

UNITED STATES PATENT OFFICE 2,559,799

OPTICAL SYSTEM AND ALIGNMENT MEANS THEREFOR

Herre Rinia and Leopold Michael Lambert Joseph Leblans, Eindhoven, Netherlands, assignors, by mesne assignments, to Hartford National Bank and Trust Company, Hartford, Conn., as trustee Application January 14, 1946, Serial No. 641,072
In the Netherlands May 30, 1942

Section 1, Public Law 690, August 8, 1946
Patent expires May 30, 1962

6 Claims. (Cl. 88—57)

Optical systems are known which comprise a concave spherical mirror and a correcting element, the optical center of the element being located at the center of curvature of the spherical mirror. In such systems the correcting element serves to correct aberrations inherent to the use of a spherical mirror. An example of an optical system of this kind is the optical system of Schmidt as described in "Lunettes et Télescopes" by Danjon et Coudert, page 254. In this system the correcting element has at least one aspherical limiting surface. However, we have already found and proposed earlier that in definite cases the correcting element may also have spherical refractive surfaces. This kind of optical system has the advantage that comparatively simple means permit a mirror objective to be obtained which has a very high luminous power and may, for instance, be used in an exposure camera.

In order that a practically unlimited field may be used in such a camera it is required for the optical center of the correcting element to be located at the center of curvature of the spherical mirror. The present invention purports to provide means which allow of establishing in a very simple manner whether the correcting element is indeed at the correct location and, if this not be the case, of obtaining, with a mutual displacement of the mirror and the correcting element, an indication when the correct adjustment has been reached.

To this end, according to the invention, the correcting element is provided with a mark indicating the center of the correcting element or located concentrically or symmetrically with this center in such manner that the correct mutual position of the mirror and the correcting element can be established by making the mark coincide with its image projected by the mirror or by making it occupy a predetermined position with respect to the said image.

When, according to one form of construction of the system according to the invention, the mark consists of a V-shaped mark, whose limbs cut each other at the center of the correcting element, the points of the V on the correcting element and of the V-shaped image will coincide if the mirror and the correcting element are correctly adjusted with respect to each other.

In another form of construction of the optical system according to the invention the mark may consist of a circle, which may or may not be entirely closed, whose center coincides with the center of the correcting element. In the correct position of the correcting element with respect to a mirror the circular mark on the correcting element and the image thereof projected by the spherical mirror will then overlap each other. In order that this may be made clearly visible, the circular mark on the correcting element may be interrupted in such manner that the image of the parts of this mark projected by the spherical mirror, when the correcting element is at the center of curvature of the spherical mirror, is just located in the intermediate spaces between the parts of the circular mark itself.

In another form of construction of the invention the mark consists of one or more pairs of marks, such as dots or the like, which are located in pairs diametrically opposite each other and at the same distance from the optical center of the correcting element. With a correct position of the correcting element with respect to the mirror the image of one mark of one pair will coincide with the other mark of this pair.

In order that the marks may be clearly visible they may, according to the invention, be given a colour different from that of the correcting element.

The manufacture of the glass correcting elements used in a system of Schmidt involves the difficulty of a complicated grinding operation, because at least one of the faces of such a correcting element is not spherical. Hence we have already proposed before to make the correcting element not from glass but from a material which at an early stage during the production of said element is capable of being deformed, more particularly gelatinised, moulded, cast under pressure, extruded or cast by extrusion. From these materials the correcting element may be made in a templet. Thus, for instance, the correcting element may on one hand consist of a material capable of being gelatinised in unhardened state and in solution, such as gelatine and agar-agar, which material is introduced into a templet and has the desired shape after having been gelatinised from the solution and dried. On the other hand the correcting element may, for instance, be made from synthetic resin by moulding it in a templet into the desired shape. To obtain the mark on such correcting elements formed in a templet one may, according to the invention, proceed in such manner that at the place where the mark is to be formed this templet exhibits a local profile variation such as a recess, a protuberance or the like in such manner that the mark on the correcting element results from the presence of this profile variation in the templet in which the said element is formed. To such end use may, for instance, be made of the center of rotation in the surface of the templet, which center results from the center of the lathe used for the manufacture of the templet.

The invention will be more fully explained by reference to the accompanying drawing.

In the drawing, Fig. 1 is a front view of a correction element according to the invention;

Figure 1:
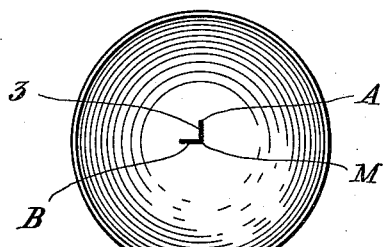
Figure 2:
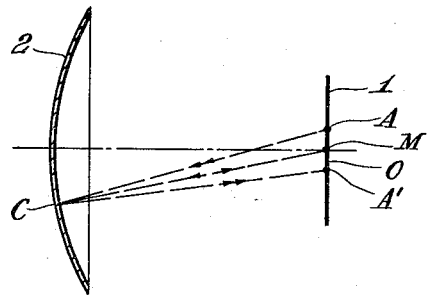
Fig. 2 is a schematic longitudinal section illustrating ray paths in an optical system of the invention.
Figure 3:
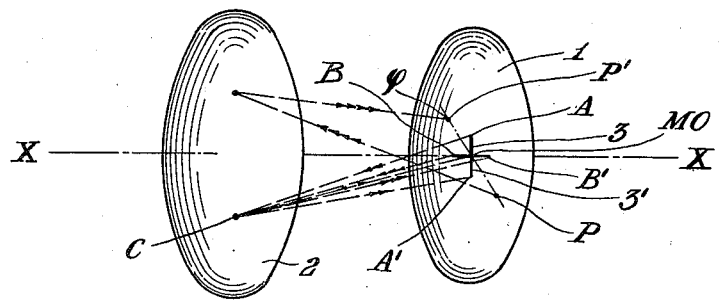
Fig. 3 is a schematic perspective view of the embodiment of the invention of Fig. 2.
Figure 4:
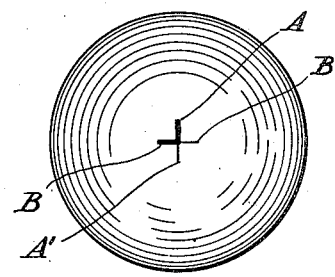
Fig. 4 is a face view of a correction element in proper position in the optical system of Figs. 2 and 3.

Figure 1 is a front view of a correcting element bearing the mark 3 which, in the present case, consists of a V-shaped mark whose limbs AM and BM extend at right angles to each other and whose center M coincides with the optical center of the correcting element. Figure 2 shows how an image A'M ensues from the limb AM of the V-shaped mark when the point M is located at the center of curvature O of a spherical mirror 2. In this figure the reference number 1 designates the correcting element and 2 the spherical mirror. In this figure the correcting element is represented as the correcting element forming part of the optical system of Schmidt. As appears from the path of the light ray MCM, an image, also located at M, then ensues of the point M of the mark 3. An image A' of the point A is obtained as appears from the path of the light ray ACA'. This also appears from Figure 3 in which the correcting element 1 and the mirror 2 are represented schematically and perspectively. From this figure it appears that if the point M of the mark 3 is located at O, viz. the center of curvature of the mirror 2, the image A'MB' of the mark 3, whose limbs are formed by AM and BM, lies in such manner that the image point of M is located again at M, whereas the images A'M and B'M of the limbs AM and BM of the mark are in alignment with the limbs AM and BM. In Figure 4 the location of the mark and of its image, when the correcting element 1 is at the center of curvature of the mirror 2, is once more shown in front view.

In adjusting the correcting element with respect to the mirror it is desirable that the mark and the image thereof projected by the spherical mirror should be viewed not only in the direction of the axis X—X of the system but also in a direction forming an angle with the axis X—X. In fact, when the correcting element is at a small distance from the correct location, observation of this inexact adjustment with a direction of observation along the axis X—X will be difficult, and the occurrence of parallax, which in the case of inexact adjustment is always present and readily perceptible when viewing the mark and its image in a direction which is not parallel with the axis X—X, tends to indicate that the adjustment is not yet quite correct.

The mark may exhibit greatly different shapes. Thus, for instance, it may also be formed by a pair of punctiform indicating marks P and P', if desired dots of paint, which are located diametrically opposite each other at equal distances from the center M of the correcting element, as shown in Figure 3. If the correcting element occupies the correct position relatively to the mirror 2 the image of P coincides with P'.

Figure 5:
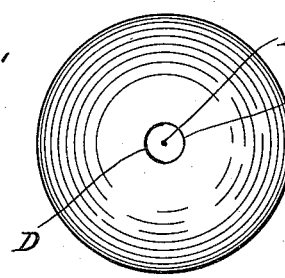
Fig. 5 is a face view of a correction element with markings thereon in accordance with another embodiment of the invention.

In another embodiment of the invention as illustrated in Fig. 5, the mark may be a segment D of a circle having the center thereof coinciding with the center M of the correcting element. Thus, in the properly aligned position of the correcting element, an image D' will be formed which either partially completes a circle with the real marking D, or wholly completes the circle if the segment is a semi-circle as indicated in Fig. 5.

Figure 6:
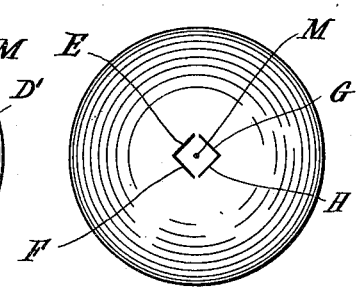
Fig. 6 is a face view of still another correction element with markings thereon in accordance with still another embodiment of the invention.

In another embodiment of the invention as shown in Fig. 6, one marking comprising two sections thereof, E and F, for example, and another marking comprising two sections, G and H, may be arranged in symmetrical relationship around a center coinciding with the center M of the correcting element. With this embodiment, on proper alignment of the lens, the images of each of the aforesaid two markings comprised of sections E, F and G, H, respectively, are superimposed upon each other. Obviously, the described markings may be of other configuration than that shown in Fig. 6 merely by way of example.

Figure 7:
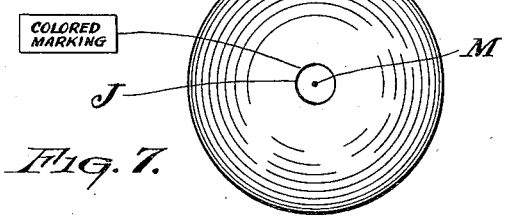
Fig. 7 is a face view of another correction element with other modified markings thereon.

Alternatively, as indicated in Fig. 7, the marking may be one which is colored differently from the natural color of the correcting element per se, so that visibility during adjustment is enhanced.

What we claim is:

1. In an optical system comprising a concave substantially spherical mirror and a spherical-aberration correcting element positioned substantially at the center of curvature of said mirror, a position locating marking on said correcting element in a position concentric thereon to form, together with its real image reflected by said mirror, a pattern symmetrical with respect to said center of curvature.

2. In an optical system comprising a concave substantially spherical mirror and a spherical-aberration correcting element having its optical center positioned substantially at the center of curvature of said mirror, a position locating marking on said correction element placed concentric thereon so as to form, with its real image reflected by said mirror, a pattern symmetrical with respect to said center of curvature.

3. In an optical system comprising a concave substantially spherical mirror and a spherical-aberration correcting element having its optical center positioned substantially at the center of curvature of said mirror, a position locating marking on said correction element placed concentric thereon so as to form, with its real image reflected by said mirror, a pattern symmetrical with respect to said center of curvature, said position locating marking being V-shaped, the vertex of the mark being substantially in the optical center of the curvature of said mirror.

4. In an optical system comprising a concave substantially spherical mirror and a spherical-aberration correcting element having its optical center positioned substantially at the center of curvature of said mirror, a position locating marking on said correction element placed concentric thereon so as to form, with its real image reflected by said mirror, a pattern symmetrical with respect to said center of curvature, said position locating marking being in the form of a segment of a circle, said segment having its center of curvature substantially in the optical center of said correction element.

5. In an optical system comprising a concave substantially spherical mirror and a spherical-aberration correcting element having its optical center positioned substantially at the center of curvature of said mirror, a position locating marking on said correction element placed concentric thereon so as to form, with its real image reflected by said mirror, a pattern symmetrical with respect to said center of curvature, said position locating marking comprising a pair of marks on each of which is superimposed the real image of the other reflected by said mirror when said correcting element is correctly positioned with respect to said mirror.

6. In an optical system comprising a concave substantially spherical mirror and a spherical-aberration correcting element having its optical center positioned substantially at the center of curvature of said mirror, a position locating marking on said correction element placed concentric thereon so as to form, with its real image reflected by said mirror, a pattern symmetrical with respect to said center of curvature, said position locating marking on said correction element having a different color from the correcting element.

HERRE RINIA.
LEOPOLD MICHAEL LAMBERT
JOSEPH LEBLANS.

REFERENCES CITED

The following references are of record in the file of this patent:

UNITED STATES PATENTS

| Number | Name | Date |
|---|---|---|
| 901,576 | Wilhelm | Oct. 20, 1908 |
| 1,213,974 | Taylor | Jan. 30, 1917 |
| 1,241,612 | Emerson | Oct. 2, 1917 |
| 1,407,176 | Stead | Feb. 21, 1922 |
| 1,471,351 | Pellow | Oct. 31, 1923 |
| 1,538,991 | Hill | May 26, 1925 |
| 1,962,356 | Mihalyi | June 12, 1934 |
| 2,072,286 | Wellington | Mar. 2, 1937 |
| 2,170,979 | Straubel | Aug. 29, 1939 |
| 2,309,788 | Remberg | Feb. 2, 1943 |
| 2,319,489 | Carlson | May 18, 1943 |
| 2,332,930 | Rinia | Oct. 26, 1943 |

OTHER REFERENCES

Johnson, "Practical Optics," 1922, published by Benn Brothers Ltd., London, pages 32, 33.

Stewart, "Physics, A Textbook for Colleges," 1931, published by Ginn & Co., Boston, Mass., page 646, art. 605.